United States Patent [19]
Lewis et al.

[11] Patent Number: 5,328,389
[45] Date of Patent: Jul. 12, 1994

[54] INTERCONNECTION RETENTION DEVICE

[75] Inventors: Mark E. Lewis, Mansfield, Mass.; David W. Mendenhall, Greenville, R.I.

[73] Assignee: Augat Inc., Mansfield, Mass.

[21] Appl. No.: 86,588

[22] Filed: Jul. 1, 1993

[51] Int. Cl.⁵ .............................................. H01R 13/60
[52] U.S. Cl. ...................................... 439/567; 439/571
[58] Field of Search ................ 439/82, 89, 544, 549, 439/564, 567, 571, 751, 620

[56] References Cited

U.S. PATENT DOCUMENTS

| | | | |
|---|---|---|---|
| 4,195,900 | 4/1980 | Hughes | 439/571 |
| 4,734,043 | 3/1988 | Emert et al. | 439/571 X |
| 4,929,194 | 5/1990 | Korsunsky et al. | 439/571 |
| 5,257,947 | 11/1993 | Scheer et al. | 439/567 |

Primary Examiner—Eugene F. Desmond
Attorney, Agent, or Firm—Weingarten, Schurgin, Gagnebin & Hayes

[57] ABSTRACT

A compressible retention element of a diameter slightly greater than that of a cooperating cavity, having a low ratio of insertion to withdrawal forces. The retention element further provides insertion and withdrawal forces reduced from that found in the prior art. One embodiment of the retention element includes a cylindrical body, manufactured of a pliant material such as plastic or the like, having a wedge-shaped groove disposed axially along its length on one side and a planar region disposed axially along its length on an opposite side.

19 Claims, 5 Drawing Sheets

INTERCONNECTION RETENTION DEVICE

FIELD OF THE INVENTION

This invention relates to retention elements for retaining an item on a mounting surface, and more particularly to compressible retention elements disposable in a retention cavity in the mounting surface.

BACKGROUND OF THE INVENTION

Retention elements such as posts are often used to mount a device onto a mounting surface. As an example, electronic component sockets may have one or more mounting posts depending from the socket body, these posts being cooperative with associated cavities in a mounting surface such as a circuit board to retain the socket on the board.

Tight dimensional tolerances are required of cylindrical retention elements engageable with cooperating cavities to ensure adequate retention force acting on the retention element without causing damage to the element on insertion. Extreme variance from desired dimensions can prevent insertion or eliminate the retention capability.

In order to ease tolerance restrictions, a retention element having a wedge-shaped groove disposed axially along the length of the element has been used. Typically, the groove has an angular width of about 30°, and a depth greater than the radius of the retention element. It has been established that such a geometry enables insertion of a retention element of diameter slightly larger than or equal to that of a cooperating cavity. In prior art retention elements having a groove as described, a deformation of the retention element cross-section is caused by limited flexing of the element sides inwardly during insertion of the element into a cavity. Rather than retaining a roughly circular cross-section, the width necessarily decreases as the sides compress. Further, the length of the cross-section as measured from the opening of the groove to the side of the element opposite the groove vertex increases. It is this deformation from a circular to an oblong cross-section which causes increased insertion forces and skiving when the prior art element is inserted into a cavity.

Several problems are prevalent with this prior art configuration. First, a minimum amount of retention element material must remain in order to resist shear and withdrawal forces. This in turn limits the maximum size of the wedge-shaped groove, and thus the amount by which the element can compress. As a result, it has been found that a retention element slightly larger than a corresponding cavity can suffer skiving wherein material is shaved off the element as it is forced into the cavity. The skiving of material and resultant decrease in retention element diameter necessarily reduces retention forces developed between the prior art retention element and the cavity during successive insertion and withdrawal cycles.

A second problem with the prior art configuration involves a disparity between an amount of force required to insert the retention element into its cavity and a force required to extract it, or equivalently, a retention force existing between the retention element and the cavity. It would be desirable to have a smaller ratio of withdrawal force to insertion force as compared to that of the prior art. With such a smaller ratio, a relatively small insertion force would be required to achieve a significant retention force between retention element and cavity.

SUMMARY OF THE INVENTION

An improved compressible retention element of a diameter slightly larger than that of a cooperating cavity, having a low ratio of insertion to withdrawal forces, is disclosed. The retention element further provides insertion forces reduced from that found in the prior art.

According to one embodiment of the invention, the improved retention element includes a cylindrical body, manufactured of a pliant material such as plastic or the like, having a wedge-shaped groove disposed axially along its length on one side and an expansion region disposed axially along its length on an opposite side. The depth of the expansion region in an illustrative embodiment is on the order of one-tenth the diameter of the retention element, depth being measured from the center of an arc, representing the removed cylindrical surface over the expansion region, to the point on the expansion region most proximate a vertex in the wedge-shaped groove.

A retention element as herein described has sufficient material to resist shear forces while minimizing the undesired results caused by insertion deformation of the element cross-section. The absence of retention element material in the expansion region compensates for the tendency of the element to expand toward the side of the element opposite the groove vertex. Thus, the tendency for skiving along the side of the element opposite the wedge-shaped groove is eliminated and a required insertion force is decreased with respect to a desired withdrawal or retention force.

BRIEF DESCRIPTION OF THE DRAWINGS

These and other features and advantages of the present invention will be better understood by reading the following detailed description, taken together with the drawings wherein.

DETAILED DESCRIPTION

Figure 1A:
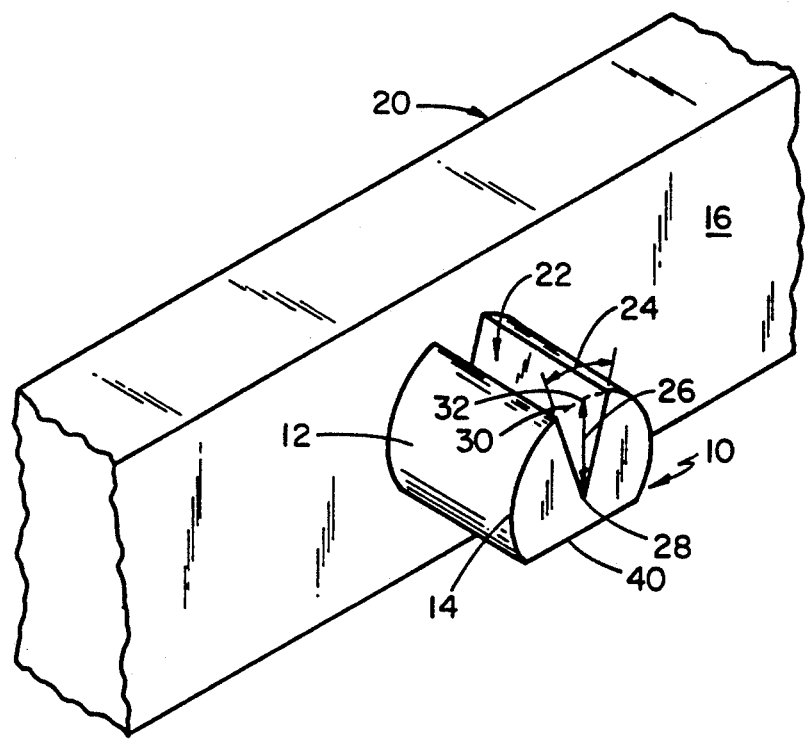
FIG. 1A is a bottom perspective view of a retention element according to one embodiment of the invention.
Figure 1B:
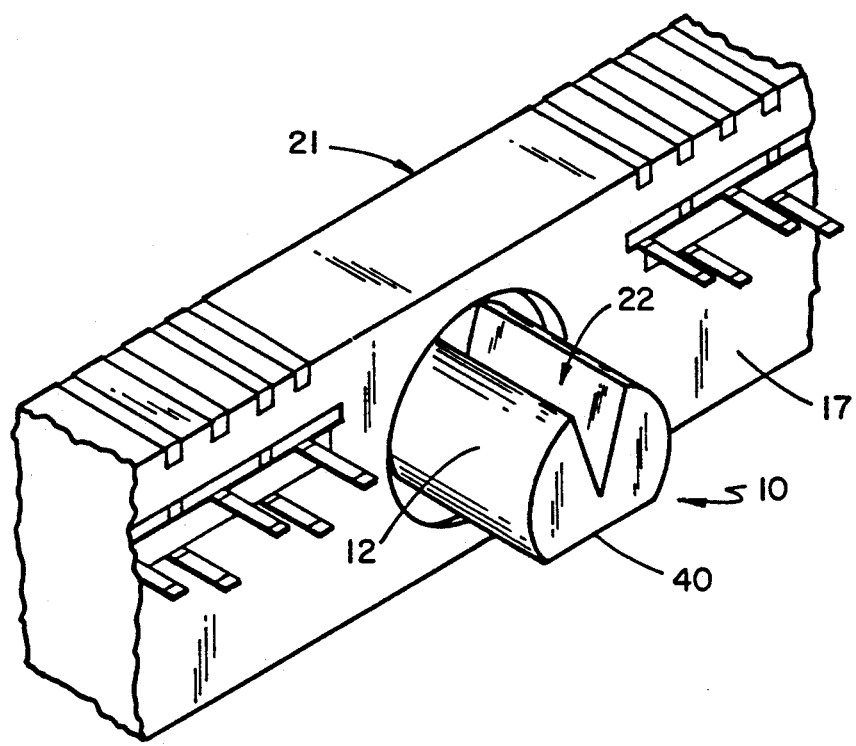
FIG. 1B is a bottom perspective view of the retention element of FIG. 1A disposed on an electronic component socket.
Figure 3:
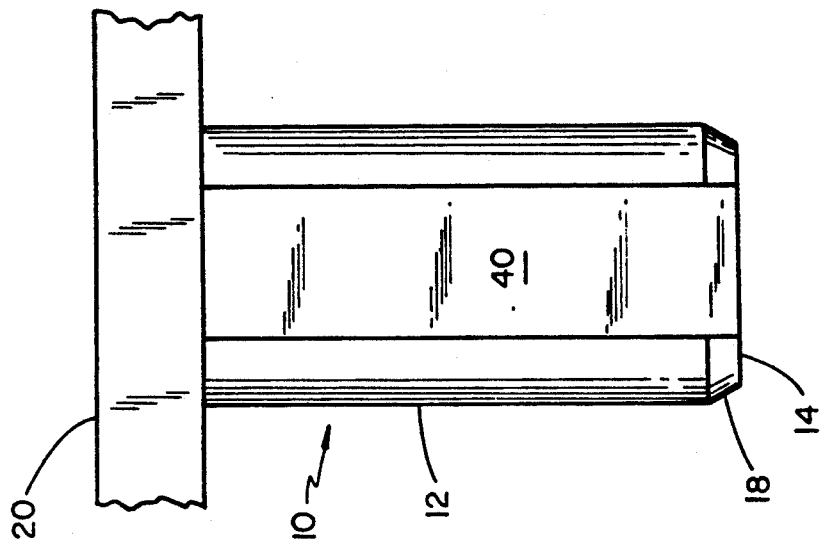
FIG. 3 is a rear elevation view of the retention element of FIG. 1.
Figure 2:
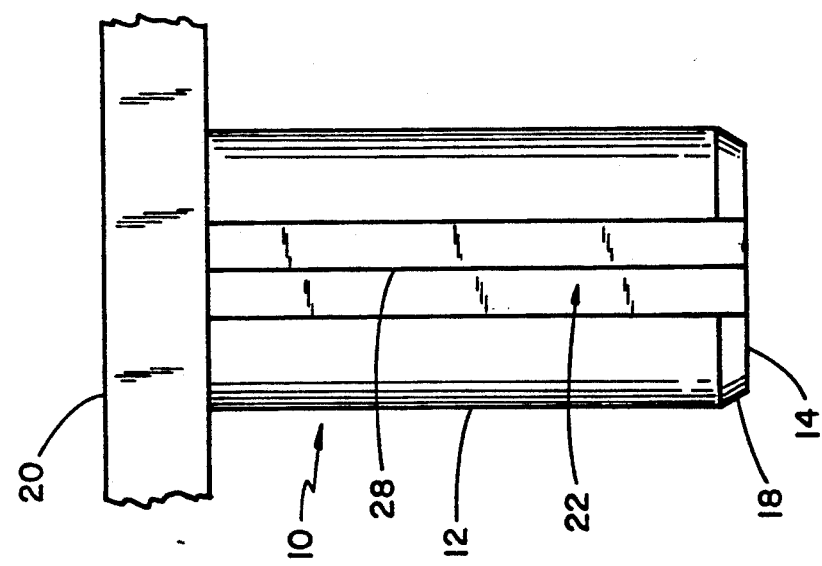
FIG. 2 is a front elevation view of the retention element of FIG. 1.
Figure 4:
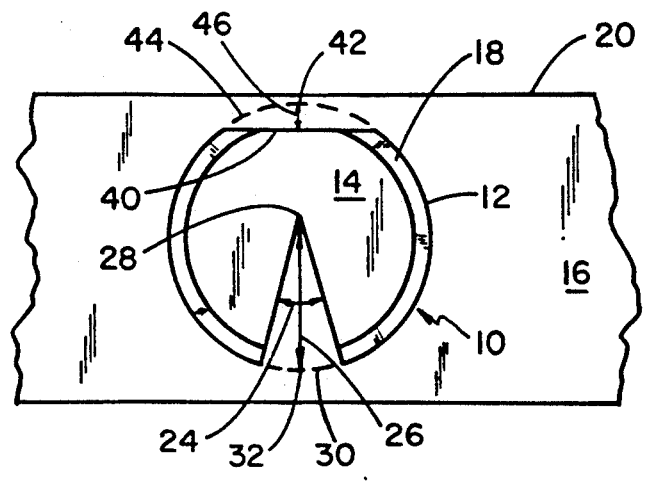
FIG. 4 is a bottom plan view of the retention element of FIG. 1.

Referring now to FIG. 1A, a retention element 10 includes a shaft portion 12 and an insertion end 14. In an illustrative embodiment, the retention element 10 is disposed on a bottom surface 16 of a mountable member 20. The mountable member 20 can be any number of items including, for instance, an electronic device socket mountable on a circuit board. The element 10 is typically made of a plastic material such as liquid crystal polymer (LCP) nylon which is typically molded integral with the mountable member 20. As illustrated in FIGS. 2–4, the insertion end 14 can have a tapered region 18 to facilitate insertion of the retention element 10 into a cooperating cavity 52. FIG. 1B illustrates an alternative embodiment in which the retention element 10 and the shaft 12 are disposed on a bottom surface 17 of an electronic component socket 21.

With reference again to FIG. 1A, a wedge-shaped groove 22 is disposed along a first side of the shaft portion 12. The groove 22 extends the full length of the shaft portion 12, as shown in FIG. 2, and has an angular width 24 of approximately 30 degrees. As shown, the groove 22 has a constant depth 26 along its entire length. Referring now to FIGS. 1 and 4, the groove depth 26 is determined by measuring the distance between a vertex 28 of the groove 22 and a center point 32 of an arc 30 representing the removed cylindrical surface over the wedge-shaped groove 22.

Also shown in FIG. 1A is an edge of an expansion region 40 at the insertion end 14 of the retention element 10. The expansion region 40 is located on a second side of the shaft 12 opposite the wedge-shaped groove 22. As better illustrated in FIG. 3, the expansion region 40 extends along the length of the retention element 10 from the mountable member 20 to the insertion end 14. Similar to the wedge-shaped groove 22, the expansion region 40 is illustrated having a constant depth 46 along its length. The expansion region depth 46, as illustrated in FIG. 4, is found by measuring the distance between the center point 42 of an arc 44 representing the removed cylindrical surface over the expansion region 40 and the most proximate point on the surface of the expansion region 40.

Figure 5:
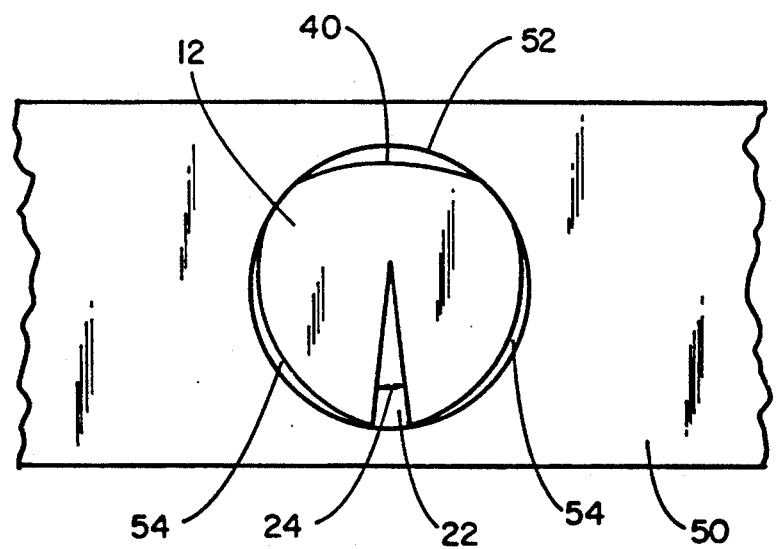
FIG. 5 is a cross-sectional view of the retention element of FIG. 1 inserted within a cavity.

FIG. 5 shows in exaggerated form how the retention element 10 is deformed upon its insertion into a cavity 52 formed in a receiving element 50. The angular width 24 of the groove 22 is decreased, thus decreasing the amount of frictional resistance to insertion and withdrawal of the shaft portion 12. Further, deformation of the shaft portion 12 causes outward bowing of the expansion region 40. Such bowing of the expansion region 40 does not adversely increase the insertion or withdrawal forces required for the present invention; the non-zero expansion region depth 46, illustrated in FIG. 4, prevents frictional resistance which would develop between the cavity wall 52 and the surface of the retention element 10 if the expansion region 40 were not present.

While both the wedge-shaped groove 22 and the expansion region 40 are illustrated having constant depths 26, 46, it is envisaged that either the groove 22 or the expansion region 40, or both, could have tapering depths along the length of the retention element 10 in order to provide an increasing or decreasing insertion force over the length of the element 10. An increased insertion force requirement could be employed to prevent over-insertion of a retention element 10 in a cavity 50. Further, while retention elements 10 have been shown without a tapered region (FIGS. 1A, 1B) and with a tapered region 18 having a single frustoconical surface (FIGS. 2–4), it is foreseeable that other geometries for a tapered region 18 could be employed. For instance, a tapered region 18 could have a hemispherical shape or could have more than one frustoconical surface.

Figure 6A:
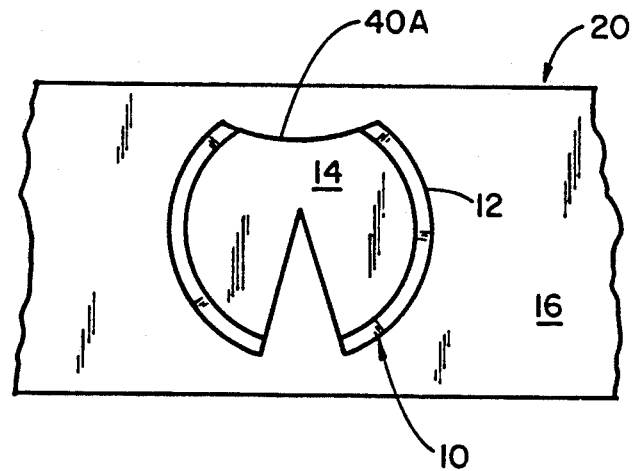
FIG. 6A is a bottom plan view of another retention element according to the invention having a concave expansion region.
Figure 6B:
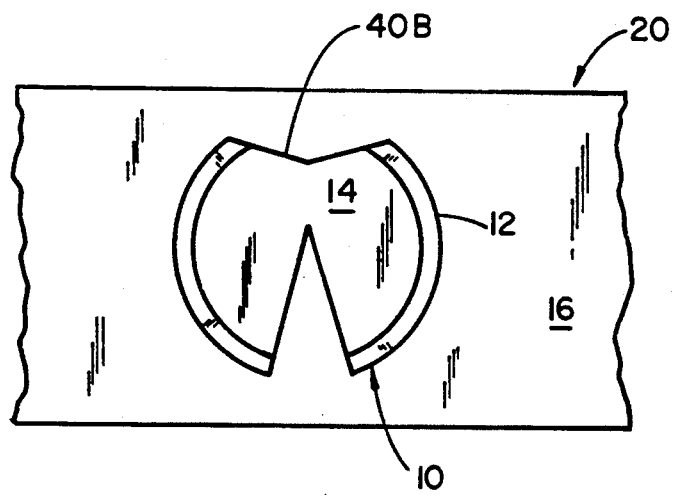
FIG. 6B is a bottom plan view of another retention element according to the invention having a shallow wedge-shaped expansion region.

The expansion region 40 has been described as having a planar surface along a second side of the shaft portion 12, as illustrated in FIGS. 1A, 1B, 4 and 5. In FIGS. 6A, and 6B, a concave expansion region 40A and a shallow wedge-shaped expansion region 40B are illustrated. Additionally, other geometries for the expansion region 40 surface are envisaged, though not illustrated.

Although the invention has been shown and described with respect to an illustrative embodiment thereof, it should be understood by those skilled in the art that the foregoing and various other changes, omissions and additions in the form and detail thereof may be made therein without departing from the spirit and scope of the invention. For example, the retention element could be other than cylindrical and disposed in a cooperatively shaped cavity.

What is claimed is:

1. A retention element disposed on a mounting portion of a member to be retained, comprising:
   a shaft portion having an attachment end disposed on said mounting portion, an insertion end disposed at an end distal to said attachment end, and a longitudinal axis extending between said attachment end and said insertion end;
   the shaft portion having outer dimensions greater than or equal to that of a cooperative cavity in a mounting surface;
   a wedge-shaped groove formed in a first side of an outer surface of said cylindrical shaft portion parallel to said longitudinal axis; and
   an expansion region having a surface formed in a second side of said outer surface of said cylindrical shaft portion parallel to said longitudinal axis and opposite to said first side.

2. The retention element of claim 1, wherein said shaft portion is substantially cylindrical.

3. The retention element of claim 1, wherein said shaft portion is a plastic material.

4. The retention element of claim 1, wherein said wedge-shaped groove extends from said attachment end to said insertion end.

5. The retention element of claim 1, wherein said expansion region extends from said attachment end to said insertion end.

6. The retention element of claim 1, wherein a tapered region having a cross-sectional diameter decreasing in the direction of said insertion end is disposed at said insertion end of said cylindrical shaft portion.

7. The retention element of claim 1, wherein a latitudinal depth measurement of said wedge-shaped groove is greater than a cross-sectional radius of said cylindrical shaft portion,
   said latitudinal depth measurement of said wedge-shaped groove measured from a center-point of an arc to a vertex of said wedge-shaped groove, and
   said arc and said outer surface of said cylindrical shaft portion having an identical radius of curvature, and said arc drawn across said wedge-shaped groove at said outer surface.

8. The retention element of claim 1, wherein a latitudinal depth measurement of said expansion region is less than forty percent of said cross-sectional radius of said cylindrical shaft portion,
   said latitudinal depth measurement of said expansion region measured from a center-point of an arc to a point on said expansion region most proximal to a vertex of said wedge-shaped groove,
   said arc and said outer surface of said cylindrical shaft portion having an identical radius of curvature, and said arc drawn across said expansion region at said outer surface.

9. The retention element of claim 1, wherein said expansion region has a planar surface formed in said second side of said cylindrical shaft portion parallel to said longitudinal axis and opposite said first side.

10. The retention element of claim 1, wherein said expansion region has a concave surface formed in said second side of said cylindrical shaft portion parallel to said longitudinal axis and opposite said first side.

11. The retention element of claim 1, wherein said expansion region has a shallow wedge-shaped surface formed in said second side of said cylindrical shaft portion parallel to said longitudinal axis and opposite said first side.

12. A retention element disposed on an electronic component socket, comprising:
   a shaft portion having an attachment end disposed on said mounting portion, an insertion end disposed at an end distal to said attachment end, and a longitudinal axis extending between said attachment end and said insertion end;
   the shaft portion having a cross sectional area greater than or equal to that of a cooperative cavity in a mounting surface;
   a wedge-shaped groove formed in a first side of an outer surface of said cylindrical shaft portion parallel to said longitudinal axis; and
   an expansion region having a surface formed in a second side of said outer surface of said cylindrical shaft portion parallel to said longitudinal axis and opposite to said first side.

13. The retention element of claim 12, wherein said shaft portion is substantially cylindrical.

14. The retention element of claim 12, wherein said shaft portion is a plastic material.

15. The retention element of claim 12, wherein said wedge-shaped groove extends from said attachment end to said insertion end.

16. The retention element of claim 12, wherein said expansion region extends from said attachment end to said insertion end.

17. The retention element of claim 12, wherein said expansion region has a planar surface formed in said second side of said cylindrical shaft portion parallel to said longitudinal axis and opposite said first side.

18. The retention element of claim 12, wherein said expansion region has a concave surface formed in said second side of said cylindrical shaft portion parallel to said longitudinal axis and opposite said first side.

19. The retention element of claim 12, wherein said expansion region has a shallow wedge-shaped surface formed in said second side of said cylindrical shaft portion parallel to said longitudinal axis and opposite said first side.

* * * * *